Patented Aug. 21, 1945

2,383,074

UNITED STATES PATENT OFFICE 2,383,074

ALKAMINE DERIVATIVES OF o-ALKOXY-METHYL BENZOIC ACID

Robert P. Parker, Somerville, N. J., and Arthur J. Hill, New Haven, Conn., assignors to American Cyanamid Company, New York, N. Y., a corporation of Maine No Drawing. Application April 16, 1942, Serial No. 439,232

6 Claims. (Cl. 260—477)

This invention relates to alkamine esters of o-alkoxymethyl benzoic acids.

According to the present invention we have found that a new series of alkamine esters of o-alkoxymethylbenzoic acids can be prepared, many of which have important properties as local anesthetics for intracutaneous use.

The compounds of the present invention may be represented by the following formula:

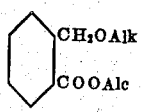

in which Alc is an amino alcohol and Alk is a hydrocarbon radical of the aliphatic series. The preferred esters are those of tertiary amino alcohols which may be represented by the formula:

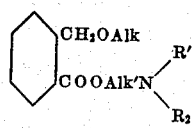

in which Alk is an aliphatic hydrocarbon, Alk' is an alkylene, and R' and R2 are hydrocarbon radicals or form a portion of a heterocyclic ring such as morpholine, piperidine, piperazine and the like. The alkylene radical may be straight chain or branch chain.

While the invention is not limited to any particular method of preparation, we prefer to react the corresponding benzoic acid anhydrides with the amino alcohol. If desired, the compounds may however be made from the corresponding lower alkyl esters of the o-substituted benzoic acids by alcoholysis with the desired amino alcohol, preferably in the presence of a strongly basic condensing agent such as a metal alcoholate.

The anhydride used in the preferred process may be prepared from o-cyanbenzyl halide such as the bromide by reaction with an alcoholate of the desired alcohol followed by hydrolysis of the cyano group. The resulting acids may be transformed into an alkali metal salt and the anhydride produced by reaction with thionyl chloride.

The esters of the present invention are secondary or tertiary amines and form the usual nitrogen addition salts such as hydrochloride sulfates, borates and the like. The salts of the bases are therefore included in the invention and in fact the salts are normally produced when the crude esters are purified by extraction with dilute acids. Quaternary nitrogen may also be prepared such for example as methiodides, methobromides and the like.

The invention will be described in greater detail in conjunction with the following specific examples in which the parts are by weikht.

EXAMPLE 1

β-Diethylaminoethyl-o-ethoxymethyl benzoate

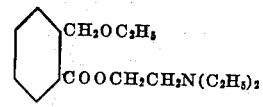

22 parts of o-ethoxymethyl benzoic anhydride and 15 parts of β-diethylaminoethyl alcohol, are heated at 130°–140° C. for 7 hours. The reaction mixture is poured into ice water and the separated oil is extracted with ether, the ether solution being dried over anhydrous sodium sulfate. After filtration, the ether is removed by distillation.

The excess β-diethylaminoethanol is removed by distillation under reduced pressure. The residual oil is extracted twice with small quantities of dry ether, the extracts being filtered from a small quantity of insoluble solid. These extracts are combined, the ether is removed by distillation, and the residue is distilled under reduced pressure. The redistilled β-diethylaminoethyl(o-ethoxymethyl) benzoate boils at 169–171° C. at 7 millimeters mercury pressure.

This base is converted to its hydrochloride salt in dry ether by the addition of dry hydrogen chloride. The precipitated hydrochloride is filtered, care being taken to exclude the presence of excessive moisture. The hydrochloride is prepared in a completely pure form by repeated solution in dry benzene and reprecipitation with ligroin. The precipitated material after standing for some time is filtered off in the absence of moist air and is dried. The pure hydrochloride salt of β-diethylaminoethyl(o-ethoxymethyl) benzoate melts at 112°–114° C.

The o-ethoxymethyl benzoic anhydride employed in the above preparation is obtained by the following procedure:

40.4 parts of sodium (o-ethoxymethyl) benzoate are suspended in 250 parts dry ether and 12 parts of thionyl chloride are slowly added. The reaction mixture is stirred and heated at the reflux until reaction is complete, and the precipitated sodium chloride is separated by filtration. After distillation of the ether, the residue is extracted with cold soda ash solution to remove some o-ethoxymethyl benzoic acid; the insoluble portion being o-ethoxymethyl benzoic anhydride which melts at 45°–46° C.

Complete nerve blocking of the sciatic nerve is obtained with from a quarter to a half percent solution and excellent duration of anesthetic action by intracutaneous injection is noted. The toxicity is slightly over half as great as that of cocaine and the duration of anesthesia somewhat superior to procaine.

EXAMPLE 2

β-Diethylaminoethyl-o-isoamyloxymethyl benzoate

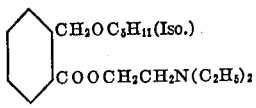

38 parts of o-isoamyloxymethyl benzoic anhydride are heated at the reflux for 14 hours at 200° C. with 21 parts of β-diethylamino-ethanol. The reaction mixture is directly distilled under reduced pressure; the fraction boiling at 178°–260° C. at 7 millimeters of mercury being collected and redistilled. The pure β-diethylaminoethyl (o-isoamyloxymethyl) benzoate boils at 186°–190° C. at 7 millimeters of mercury.

The hydrochloride salt of this ester is prepared by precipitation from an ether solution of the free base through the addition of dry hydrogen chloride. Solution of the precipitated salt in benzene and reprecipitation through the addition of ligroin prepares a pure hydrochloride which melts at 79°–80° C.

The o-isoamyloxymethyl benzoic anhydride employed in this preparation is prepared in the following manner:

150 parts of o-cyanbenzylbromide dissolved in 245 parts of isoamyl alcohol are added at reflux temperature to a solution of 18 parts of sodium in 244 parts of isoamyl alcohol. The reaction mixture is maintained at reflux temperature until complete, and after filtration of the sodium bromide the alcohol is removed by distillation under reduced pressure. The oily residue is washed with water, is dissolved in ether, dried with anhydrous sodium sulfate, the ether is distilled, and the o-isoamyloxymethyl benzonitrile is purified by distillation (boiling point 145°–147° C. at 8 millimeters of mercury). 127 parts of this nitrile are refluxed in a solution containing 90 parts of caustic in 1980 parts of 5% alcohol solution. Refluxing is maintained until the evolution of ammonia is complete, the reaction mixture is cooled, clarified, and acidified with hydrochloric acid. The white precipitated material is filtered off, well washed with water, and dried. The o-isoamyloxymethyl benzoic acid when recrystallized from 10% alcohol solution melts at 69°–70° C. 11.4 parts of sodium are dissolved in 98 parts of alcohol and to this solution are added 110 parts of this acid dissolved in 200 parts of alcohol. The resulting solution is refluxed, clarified, and the alcohol is removed by heating under diminished pressure. 109 parts of the sodium salt of o-isoamyloxymethyl benzoic acid are suspended in 200 parts of dry ether, and to this suspension are added slowly 26 parts of thionyl chloride. After filtration of the sodium chloride and evaporation of the ether, the oil so obtained is washed by cold soda ash solution. The unextracted portion is again dissolved in ether, dried over anhydrous sodium sulfate, the ether is removed by distillation, and the residual material is distilled under reduced pressure. The o-isoamyloxymethyl benzoic anhydride is an oil (boiling point 250–260° C. at 7 millimeters mercury).

The toxicity is the same as compounds of Example 1 but the duration of anesthesia is about 48 minutes instead of 38 minutes.

EXAMPLE 3

β-Diethylaminoethyl-o-n-butoxymethyl benzoate

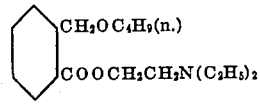

39.7 parts of o-n-butoxymethyl benzoic anhydride are refluxed for 19 hours at 200° C. with 25 parts of β-diethylaminoethanol. The reaction mixture is directly distilled under reduced pressure and the β-diethylaminoethyl (o-n-butoxymethyl) benzoate, is obtained (boiling point 182–188° C. at 7 millimeters mercury).

The hydrochloride salt is obtained by dissolving the free base in ether and precipitation through addition of dry hydrogen chloride. The hydrochloride is obtained in a pure form through solution in benzene and reprecipitation with ligroin. The hydrochloride melts at 74°–75° C.

The o-n-butoxymethyl benzoic anhydride employed in the above preparation is obtained in the following manner:

18 parts of sodium are dissolved in 275 parts of n-butanol and at reflux temperature 150 parts of o-cyanbenzylbromide dissolved in 275 parts of n-butanol are slowly added. Refluxing is continued until the solution shows a neutral reaction. The sodium bromide is removed by filtration, the butanol is removed by distillation, and the residue is purified by distillation. The o-n-butoxymethyl benzonitrile is a liquid (boiling point 139–141° C. at 9 millimeters mercury). 120 parts of o-n-butoxymethyl benzonitrile are added to a solution of 90 parts of sodium hydroxide in 2000 parts of 5% alcohol. Reflux is maintained until the reaction is complete as indicated by the cessation of ammonia evolution. After clarification, the o-n-butoxymethyl benzoic acid is precipitated by acidification. When pure, this acid melts at 63° C. To 9.5 parts of sodium in 98 parts of alcohol are added 90 parts of o-n-butoxymethyl benzoic acid in 188 parts of alcohol. After heating for a short time, the solution is clarified and the alcohol is removed by distillation. 103 parts of this sodium salt are suspended in 375 parts of ether and to this suspension are added slowly 26 parts of thionyl chloride. When reaction is complete, the sodium chloride is separated by filtration, the ether is removed by distillation and the o-n-butoxymethyl benzoic anhydride is purified by distillation (boiling point 244°–250° C. at 7 millimeters of mercury).

The properties are very similar to that of the compound of Example 1.

EXAMPLE 4

β-Diethylaminoethyl-o-normal-amyloxymethyl benzoate

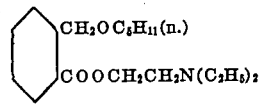

5 parts of o-n-amyloxymethyl benzoic anhydride are heated with 3 parts of β-diethylaminoethanol at 200° C. for 15 hours. The reaction mixture is subjected directly to distillation under reduced pressure and the β-diethylaminoethyl (o-n-amyloxymethyl) benzoate is obtained as an oil (boiling point 198°–202° C. at 10 millimeters mercury). The hydrochloride of this base is prepared by precipitation from ether solution through the addition of hydrogen chloride. Purification by solution in benzene and re-precipitation with ligroin yields a salt which melts at 81–82° C.

The o-n-amyloxymethyl benzoic anhydride employed in the above preparation is obtained in the following manner:

18 parts of sodium are dissolved in 275 parts of n-amyl alcohol and at reflux temperature 150 parts of o-cyanbenzylbromide dissolved in 275 parts of n-amyl alcohol are slowly added. When reaction is complete, the sodium bromide is separated by filtration, the alcohol is removed by distillation, and the o-n-amyloxymethyl benzonitrile is purified by distillation (boiling point 158–160° C. at 12 millimeters mercury). 116 parts of o-n-amyloxymethyl benzonitrile are added to a solution of 80 parts of caustic in 2000 parts of 5% alcohol. Reflux is maintained until the evolution of ammonia ceases, then the reaction mixture is cooled, clarified, and the o-n-amyloxymethyl benzoic acid is separated by acidification with hydrochloric acid. When purified by recrystallation, the acid melts at 54–55° C.

11 parts of sodium are dissolved in 98 parts of alcohol and 108 parts of this acid dissolved in 188 parts of alcohol are added. The solution is refluxed a short time, clarified, and the alcohol is removed by distillation. 88 parts of this sodium salt are suspended in 380 parts of ether and while stirring, 21 parts of thionyl chloride are added slowly. Heating is continued until the reaction is complete and after filtration of the precipitated sodium chloride, the ether is removed by distillation. The o-n-amyloxymethyl benzoic anhydride is purified by distillation under reduced pressure (boiling point 264°–266° C. at 7 millimeters mercury).

The toxicity is slightly less than that of cocaine and duration of anesthesia 186 minutes.

EXAMPLE 5

β-Dibutylaminoethyl-o-isoamyloxymethyl benzoate

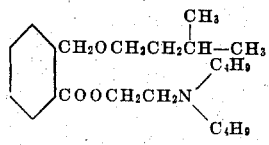

The procedure of Example 2 is followed except that a stoichiometrically equivalent amount of β-dibutylaminoethanol is substituted for the β-diethylaminoethanol. A high boiling oil is obtained having properties similar to the compound of Example 2 but with slightly higher anesthetic power.

EXAMPLE 6

β-Dibutylaminopropyl-o-ethoxymethyl benzoate

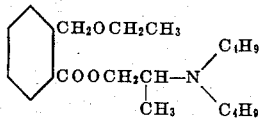

The procedure of Example 1 is followed except that a stoichiometrically equivalent quantity of β-dibutylaminopropanol is substituted for the β-diethylaminoethanol. A good yield of a high boiling oil is obtained which shows anesthetic properties similar to those of Example 1 having slightly greater anesthetic action.

We claim:

1. A compound included in the group consisting of alkamine esters of o-alkoxymethyl benzoic acid having the formula:

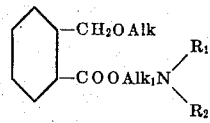

in which Alk is an aliphatic hydrocarbon, $Alk_1$ is an alkylene, and $R_1$ and $R_2$ are included in the group consisting of aliphatic hydrocarbon radicals and radicals forming a portion of a saturated heterocyclic ring and salts thereof.

2. A dialkylaminoalkyl ester of o-ethoxymethyl benzoic acid.

3. A dialkylaminoalkyl ester of an o-butoxymethylbenzoic acid.

4. A dialkylaminoalkyl ester of an o-amyloxymethylbenzoic acid.

5. A method of preparing an alkamine ester of an o-alkoxymethylbenzoic acid, which comprises reacting an amino alcohol having the formula:

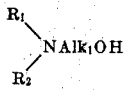

in which $Alk_1$ is alkylene, and $R_1$ and $R_2$ are included in the group consisting of aliphatic hydrocarbon radicals and a portion of a saturated heterocyclic ring with anhydride of an ortho-alkoxymethyl benzoic acid.

6. A method of preparing an alkamine ester of an o-alkoxymethylbenzoic acid, which comprises reacting a dialkylamino alkanol with an anhydride of an o-alkoxymethylbenzoic acid.

ROBERT P. PARKER.
ARTHUR J. HILL.